(12) United States Patent
Woods

(10) Patent No.: US 6,912,097 B2
(45) Date of Patent: Jun. 28, 2005

(54) IRIS DIAPHRAGM

(75) Inventor: Keith Woods, Storrington (GB)

(73) Assignee: Wilkes Iris Limited (GB)

( * ) Notice: Subject to any disclaimer, the term of this patent is extended or adjusted under 35 U.S.C. 154(b) by 0 days.

(21) Appl. No.: 10/633,546

(22) Filed: Aug. 5, 2003

(65) Prior Publication Data

US 2004/0066565 A1 Apr. 8, 2004

(30) Foreign Application Priority Data

Aug. 6, 2002 (GB) .............................................. 0218224

(51) Int. Cl.[7] .......................... G02B 9/00; G02B 9/08; G03B 9/08; G03B 9/02; G03B 9/10
(52) U.S. Cl. ....................... 359/739; 359/894; 396/452; 396/505; 396/493; 396/510
(58) Field of Search ................................. 359/739, 894, 359/227, 234; 396/462, 463, 474, 487, 488, 493, 510, 452, 505; 353/75, 97

(56) References Cited

U.S. PATENT DOCUMENTS

| | | | | |
|---|---|---|---|---|
| 3,727,531 A | * | 4/1973 | Baab | 396/510 |
| 4,009,946 A | * | 3/1977 | Geyer et al. | 359/234 |
| 4,257,086 A | * | 3/1981 | Gulliksen | 362/279 |
| 4,306,511 A | * | 12/1981 | Ashby et al. | 29/521 |
| 6,102,554 A | * | 8/2000 | Wynne Willson et al. | 362/281 |

* cited by examiner

*Primary Examiner*—Hung Xuan Dang
*Assistant Examiner*—Joseph Martinez
(74) *Attorney, Agent, or Firm*—Diller, Ramik & Wight

(57) ABSTRACT

An iris diaphragm comprising an annular base, an annular rotatable element and a number of leaves which can be mounted to form a variable aperture, each leaf extending between the base and element and being connected thereto in a pivotal relationship, is characterised in that a first end of each of said leaves is pivotally connected to an opening provided on the element or base by means of a burst hole joint, and a second end of each of said leaves being rotatably secured in a sliding relationship to a slide provided on the base or the element by means of a slide pin secured to the leaf.

6 Claims, 2 Drawing Sheets

IRIS DIAPHRAGM

BACKGROUND OF THE INVENTION

This invention relates to an iris diaphragm which is particularly, but not exclusively, for use with spot lights.

An iris diaphragm comprises a number of overlapping curved leaves mounted in a circle around an aperture, which can be rotated in unison to adjust the diameter of the aperture. Iris diaphragms are commonly used with spot lights, to narrow or broaden the beam of light. They are also used to regulate the amount of light entering an optical instrument, for example a camera.

An iris diaphragm comprises a base provided with an aperture, a rotatable element provided with a corresponding aperture, and a number of curved leaves, one end of which are mounted in a fixed pivotal position to one of the element or base, and the other end of which are mounted in a sliding pivotal position to the other of the element or base.

The leaves are mounted at equal points around the circumference of the aperture, and are so shaped that the curve along their inner edge corresponds to the curvature of the aperture, so when they are in the fully retracted position the aperture is unobstructed.

When the element or the base is rotated the leaves are rotated about their fixed pivot and cross over the aperture. Most irises can move from a fully open position to a fully closed position in approximately 110 degrees of rotation.

Spot lights are commonly cumbersome in size and shape, and can be fitted with adjustable colour filters and various electronic or electric components. The iris diaphragm is mounted before the light chamber, in the vicinity of any filters or the like.

An iris diaphragm comprising an aperture corresponding to the size of a spot light can be large in size. In particular, the base, rotating element, fixed and sliding pivots combine to produce an item which can be several centre meters in width. This can be a problem when several independent items of equipment have to be mounted before a spot light.

The present invention is intended to overcome some of the above problems.

SUMMARY OF THE INVENTION

According to the present invention an iris diaphragm comprising an annular base, an annular rotatable element and a number of leaves which can be mounted to form a variable aperture, each leaf extending between the base and element and being connected thereto in a pivotal relationship, is characterised in that a first end of each of said leaves is pivotally connected to an opening provided on the element or base by means of a burst hole joint, and a second end of each of said leaves being rotatably secured in a sliding relationship to a slide provided on the base or the element by means of a slide pin secured to the leaf.

Preferably the burst hole joints attach the leaves to the rotatable element, and the slides are provided in the base.

The leaves can be mounted at equal points around the circumference of the iris aperture, and the inner edge of the leaves can be provided with a curve which corresponds to the curvature of the aperture.

The burst hole joints can comprise an opening, through which the material of the leaf has been punched. The parts of the leaf which extend through the opening are folded back against the rotatable element to provide a secure fixing.

The second ends of the leaves are provided with slide pins, which are adapted to fit inside the slides. The slide pins can be of a known construction, and can comprise a cylindrical pin element which can be secured to the leaf in any known way.

In one construction the iris can be provided with 18 leaves.

The present invention can be performed in various ways but one embodiment will now be described by way of example and with reference to the accompanying drawings in which:

DETAILED DESCRIPTION OF THE PREFERRED EMBODIMENTS

Figure 1:
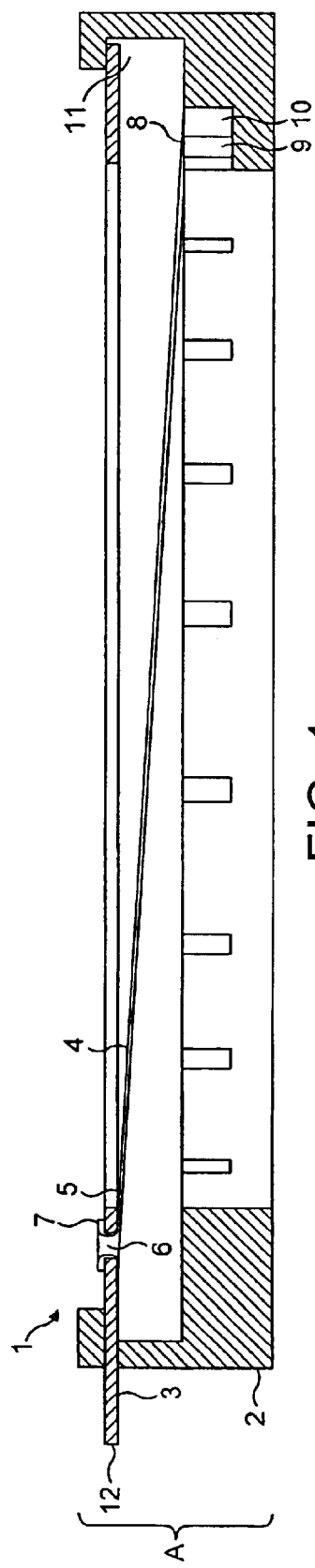
FIG. 1 is a cross sectional side view of a diaphragm iris according to the present invention, showing one leaf mounted in the iris.

In FIG. 1 an iris diaphragm 1 comprises a base 2, a rotatable disc 3 and a number of leaves 4 (only one leaf shown in FIG. 1). A first end 5 of the leaf 4 is rotatably attached to an opening 6 provided in the disc 3, by means of a burst hole joint 7. A second end 8 of the leaf 4 is provided with a pin 9 which is positioned in a slide 10, which is provided in the base 2.

Figure 2:
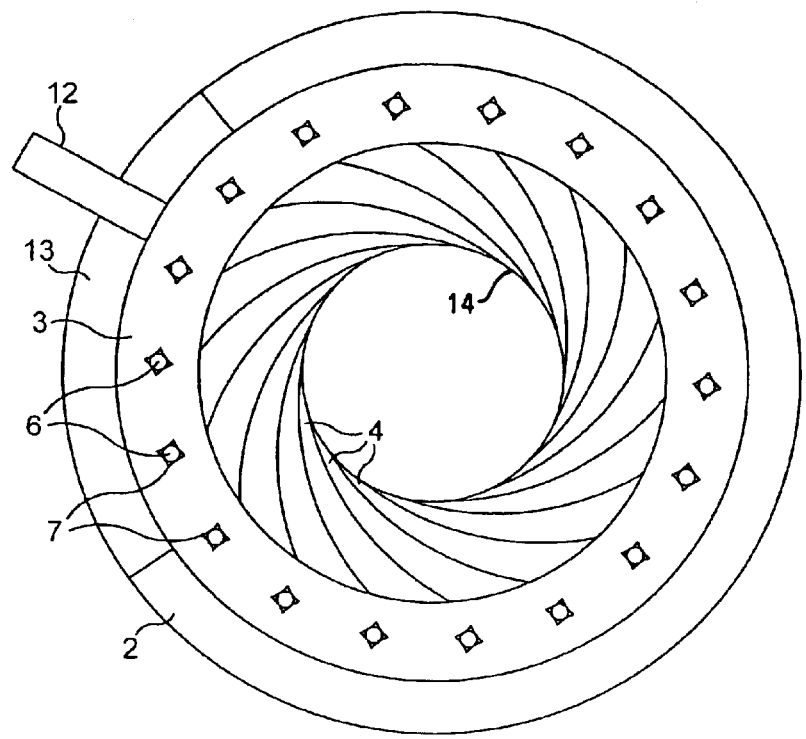
FIG. 2 is a sectional plan view of the diaphragm iris as shown in FIG. 1.
Figure 3:
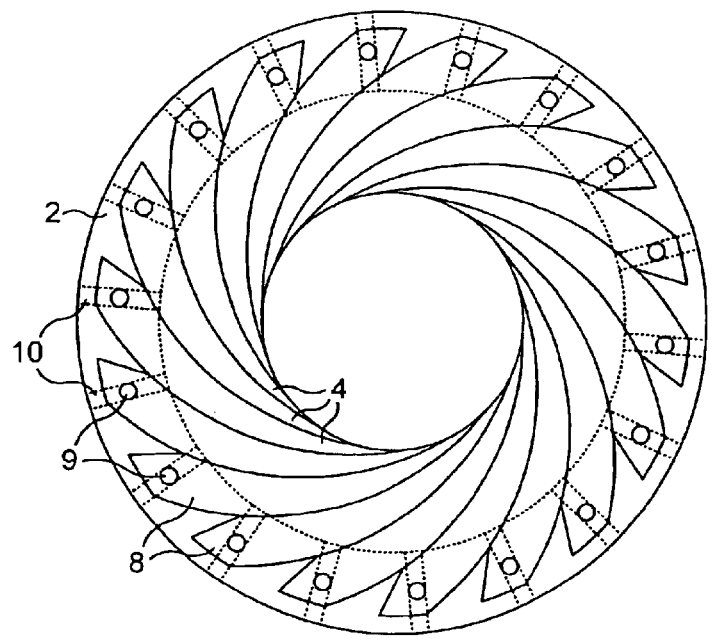
FIG. 3 is a further sectional plan view of the diaphragm iris as shown in FIG. 1.

As shown in FIG. 2 the disc 3 is provided with eighteen apertures 6, one for each of the eighteen burst hole joints 7 on each of the overlapping leaves 4. Accordingly, as shown in FIG. 3 the base 2 (the outline of which is shown in broken lines) is provided with eighteen slides 10, and each leaf 4 is provided with a pin 9, which is positioned in one slide 10.

The disc 3 is positioned in a slot 11 (as shown in FIG. 1) provided in the base 2, and it is provided with an operating handle 12, positioned in a further slot 13 (as shown in FIG. 2) provided in the base 2.

When the disc 3 is rotated by the handle, the end 5 of each leaf 4 is drawn in a circular direction by the joints 7. The joints 7 also rotate on their own axis due to the second ends 8 of each leaf 4 being positioned in the stationary slides 10.

As a result of the above described action, each pin 9 is moved along each slide 10. In the movement from fully retracted to fully advanced, each pin moves first towards the centre of the iris aperture 14, then back in the opposite direction as the joints 7 follow their circular course.

The leaves 4 are so shaped that the above described actions result in the iris aperture 14 closing. The aperture can be opened, or placed in any desired position, by the positioning of the handle 12.

Iris diaphragm 1 is provided with a narrow width, Distance A, due to the narrow width of the burst hole joints 7 and the pin 9 and slide 10 mechanisms. It will be appreciated that Distance A is restricted only by the capacity to machine the pin 9 onto the leaf 4. The width of the iris diaphragm 1 is determined by size of pin 9 which can effectively be attached to the leaf 4.

In an alternative construction the handle 12 is connected to an operating means, for example an electric motor, which can be electronically controlled.

It will further be appreciated that the above described invention can be used in any application provided with an iris, for example optical equipment or cameras.

The above invention can also be used in a dual plane iris diaphragm of the known type, which closes the aperture completely.

In an alternative construction, not shown, the pivotal arrangements are reversed and the openings 6 are provided on the base 2, and the slides 10 are provided on the rotatable element 3.

Thus an iris diaphragm is provided with a narrow width, so it can be readily incorporated into a spot light rig. Further, a novel iris diaphragm construction is provided, which has a small number of working parts, and which can be readily constructed.

Although a preferred embodiment of the invention has been specifically illustrated and described herein, it is to be understood that minor variations may be made in the apparatus without departing from the spirit and scope of the invention, as defined by the appended claims.

What is claimed is:

1. An iris diaphragm comprising an annular base and an annular rotatable element, a plurality of leaves having opposite first and second end portions, first means for freely pivotally connecting each leaf first end portion to one of said annular base and annular rotatable element, second means for pivotally slidably connecting each leaf second end portion to the other of said annular base and annular rotatable element, each first means including an opening in one of said annular base and annular rotatable element through which passes a tubular connecting portion punched from the material of the associated leaf, a terminal end of each tubular connecting portion being folded back against the one of said annular base and annular rotatable element to effect a secure free pivotal connection therebetween, and said second means including a slide pin carried by each leaf second end portion which is slidably and pivotally engaged with a slide provided on the other of said annular base and annular rotatable element.

2. The iris diaphragm as defined in claim 1 wherein said first freely pivotally connecting means freely pivotally connects each leaf first end portion to said annular base, and said slides are provided on the annular rotatable element.

3. The iris diaphragm as defined in claim 1 wherein said first freely pivotally connecting means freely pivotally connects each leaf first end portion to said annular rotatable element, and said slides are provided on said annular base.

4. The iris diaphragm as defined in claim 1 wherein said second connecting means is a slide pin carried by each leaf second end in sliding engagement with an associated one of said slides.

5. The iris diaphragm as defined in claim 1 wherein said second connecting means is a slide pin carried by each leaf second end in sliding engagement with an associated one of said slides, and each slide pin is of a cylindrical configuration.

6. The iris diaphragm as defined in claim 1 wherein said first and second connecting means connect said leaves at equal points around a circumference of said variable iris aperture defined thereby, and inner edges of said leaves are curved in correspondence to the curvature of said variable iris aperture.

* * * * *